(12) United States Patent
Davidsson

(10) Patent No.: US 6,497,454 B1
(45) Date of Patent: Dec. 24, 2002

(54) VEHICLE SEAT CONTROL LEVER

(75) Inventor: Staffan Davidsson, Västra Frölunda (SE)

(73) Assignee: Scania CV Aktiebolag (publ) (SE)

( * ) Notice: Subject to any disclaimer, the term of this patent is extended or adjusted under 35 U.S.C. 154(b) by 0 days.

(21) Appl. No.: 09/763,384

(22) PCT Filed: Aug. 26, 1999

(86) PCT No.: PCT/SE99/01460

§ 371 (c)(1),
(2), (4) Date: Feb. 21, 2001

(87) PCT Pub. No.: WO00/12347

PCT Pub. Date: Mar. 9, 2000

(30) Foreign Application Priority Data

Aug. 28, 1998 (SE) .............................................. 9802880

(51) Int. Cl.⁷ .............................................. A47C 3/025
(52) U.S. Cl. ................................ 297/284.3; 297/284.6; 297/DIG. 3
(58) Field of Search ....................... 297/DIG. 3, 452.41, 297/284.1, 284.3, 284.4, 284.6, 284.9

(56) References Cited

U.S. PATENT DOCUMENTS

| | | | |
|---|---|---|---|
| 3,156,134 A | 11/1964 | Forrester, Jr. | |
| 4,444,430 A | * 4/1984 | Yoshida et al. | |
| 4,552,402 A | 11/1985 | Huber et al. | ................. 297/284 |
| 4,592,588 A | 6/1986 | Isono et al. | ................. 297/284 |
| 5,038,086 A | 8/1991 | Ahmed et al. | ................ 318/286 |
| 5,433,506 A | * 7/1995 | Jensen | |
| 5,482,353 A | * 1/1996 | Lance | |

FOREIGN PATENT DOCUMENTS

| | | |
|---|---|---|
| GB | 2144511 | 3/1985 |
| SE | 464805 | 6/1991 |

* cited by examiner

Primary Examiner—Milton Nelson, Jr.
(74) Attorney, Agent, or Firm—Ostrolenk, Faber, Gerb & Soffen, LLP

(57) ABSTRACT

A setting arrangement for a seat in a vehicle and particularly the backrest. The backrest includes at least three separate support elements, perhaps with one above another, possibly with lateral support elements laterally outwardly. Each of the support elements is independently adjustable in shape. A respective adjustment device adjusts the shape of each of the support elements. One control lever which is connected with all of the adjustment devices is movable in different directions for adjusting the adjustment devices and the support elements.

12 Claims, 2 Drawing Sheets

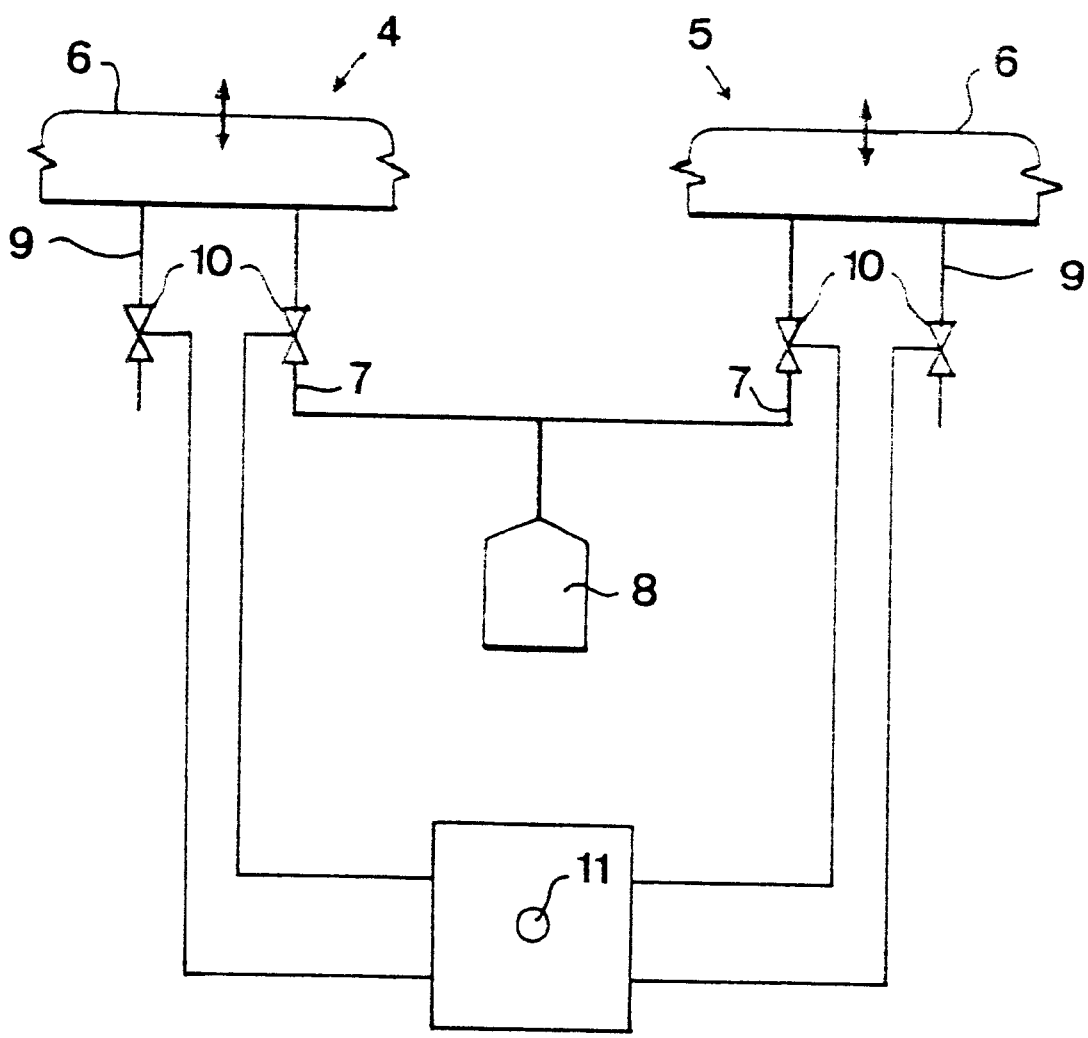

VEHICLE SEAT CONTROL LEVER

BACKGROUND TO THE INVENTION, AND STATE OF THE ART

The present invention relates to a setting arrangement for a seat and particularly to control over the support elements in the seat.

A known practice is to provide vehicle seats with various adjustment facilities for adapting the shape of the seat to the individual who sits in it. Also known is the provision of such adjustments by means of various support elements which are placed at various positions in the seat and which may for example include rubber bladders whose shape may be altered by input/discharge of compressed air. In such cases, adjustment of the seat may be accomplished by opening the respective inlet/outlet valves of each of the rubber bladders. In this respect the state of the art uses at least one separate control element for each rubber bladder.

U.S. Pat. No. 5,038,086 refers to a setting arrangement for adjusting the two front seats in a vehicle. That setting arrangement includes a number of different setting elements for different possible adjustments. That setting arrangement includes, inter alia, a control lever in the form of a so-called "joystick" by which the sitting surface of the seat can be raised or lowered by the control lever being moved respectively to the left or the right and by which the sitting surface can be shifted forwards or rearwards by the control lever being moved respectively forwards or rearwards.

With the known setting arrangements, vehicle seat adjustment in such a way as to suit the individual who sits in the seat is thus a lengthy and time-consuming operation. Moreover, if a vehicle driver tries to adjust the seat while driving, this may cause a traffic hazard.

SUMMARY OF THE INVENTION

The object of the present invention is to provide a setting arrangement by which the adjustment of a vehicle seat can be accomplished in a simpler manner than heretofore.

This object is achieved with a setting arrangement which incorporates only one control lever which is designed to make it possible to adjust the shape of said support elements. Only one control lever being used for adjusting all the support elements of the seat substantially simplifies the adaptation of the seat to the individual who sits in it. It also reduces the risk of traffic accidents in the event of adjustment being carried out by the vehicle driver while driving.

According to one embodiment of the invention, the support elements are placed in a particular configuration and the control lever is designed to initiate adjustment of the shape of the various support elements by its being movable in a manner which corresponds to said configuration. This means that the control lever can follow the mental picture which the user has of the system, i.e. the locations of the various support elements. Such a configuration also makes it easier to learn the operation of the setting arrangement and requires a minimum of attention from the user.

According to a further embodiment of the invention, the control lever is so designed that a movement forwards with respect to the normal direction of forward movement of the vehicle causes relevant support elements to shift outwards away from the seat, whereas a corresponding movement rearwards causes relevant support elements to shift inwards towards the seat. Such a control lever movement configuration corresponds in a substantially intuitive manner to operating the control lever in order respectively to take pressure out of, and put pressure into, one or more support elements.

According to a further embodiment of the invention, the control lever is so designed that a pulling movement outwards causes relevant support elements to shift outwards away from the seat, whereas a corresponding pushing movement inwards causes relevant support elements to shift inwards towards the seat. Such a control lever movement configuration corresponds in a substantially intuitive manner to operating the control lever in order respectively to take pressure out of, and put pressure into, one or more support elements.

According to a further embodiment of the invention, the setting arrangement includes a basic unit on which the control lever is arranged in such a manner as to protrude from the basic unit, while at the same time the control lever is designed to assume a neutral position in which it extends substantially perpendicular from the basic unit. In this case, said support elements may be arranged in a backrest of said seat. The control lever in said neutral position may also extend substantially horizontally and be so designed that a movement with a component directed upwards from said neutral position activates an upper support element in the backrest, whereas a corresponding movement with a component directed downwards activates a lower support element of the backrest. Such a control lever movement configuration corresponds in a substantially intuitive manner to operating the control lever in order respectively to take pressure out of, and put pressure into, support elements at various heights of the seat backrest.

According to a further embodiment of the invention, said support elements include two lateral support elements and at least one back support element which is arranged between said lateral support elements.

According to a further embodiment of the invention, substantially every support element includes a reservoir made of an at least partially flexible material which allows the reservoir to be expanded in at least one direction by input of a medium and be contracted in said direction by discharge of said medium.

BRIEF DESCRIPTION OF THE DRAWINGS

The present invention will now be explained in more detail by means of an embodiment described by way of example and with reference to the attached drawings, in which:

FIG. 5 shows schematically how the setting arrangement is connected to various support elements of the seat.

DETAILED DESCRIPTION OF AN EMBODIMENT OF THE INVENTION

Figure 1:
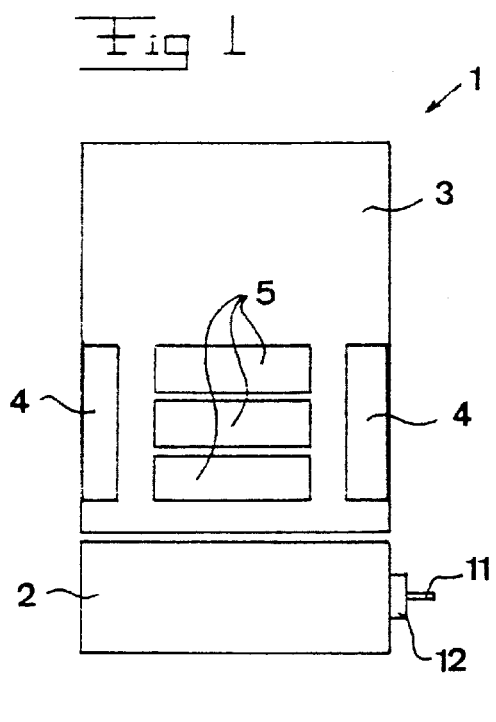
FIG. 1 shows schematically a view from the front of a vehicle seat with a setting arrangement according to an embodiment of the invention.
Figure 2:
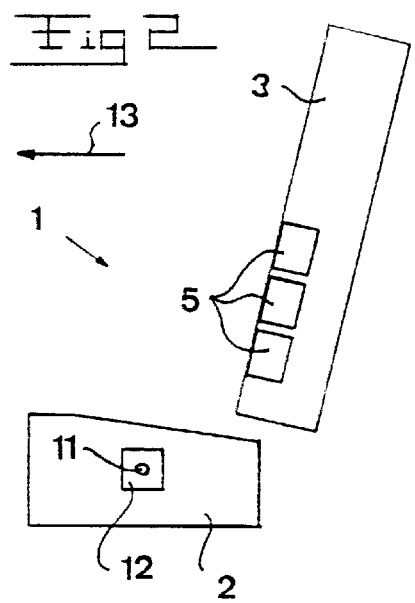
FIG. 2 shows schematically a side view of the vehicle seat in FIG. 1.

FIGS. 1 and 2 depict a vehicle seat 1 with a sitting surface 2 and a backrest 3. The backrest 3 in the embodiment depicted comprises five separate support elements, two of which constitute lateral support elements 4 and three constitute back support elements 5 which are arranged between the lateral side elements 4. The support elements 4 and 5 are each designed to provide support for respective parts of the body of an individual who sits in the seat 1. In order to make it possible for the shape of the seat 1 to be adapted to the individual who sits in it, the shape of each support element 4 and 5 is adjustable independently of the other support elements 4,5.

FIG. 5 shows in more detail an example of how the shape of each individual support element 4,5 can be adjusted. It should be noted that, for the sake of simplicity, FIG. 5 shows only one lateral support element 4 and one back support element 5. Each support element 4,5 thus incorporates a reservoir 6 which is flexible and allows the reservoir 6 to expand in at least one direction. The reservoir 6 may for example be made of rubber over at least part of its extent. Each reservoir 6 is connected by an inlet line 7 to a source 8 which is designed to provide a pressurised medium. The source 8 may for example incorporate a compressed air compressor to make it possible to supply compressed air to the reservoirs 6. Each reservoir 6 is also connected via an outlet line 9 to the surrounding atmosphere to make it possible to discharge compressed air from the reservoir 6. Each inlet line 7 and outlet line 9 incorporates a valve 10 which is closed in a position of rest and openable by means of a control lever 11 of a setting arrangement in accordance with the present invention.

Figure 3:
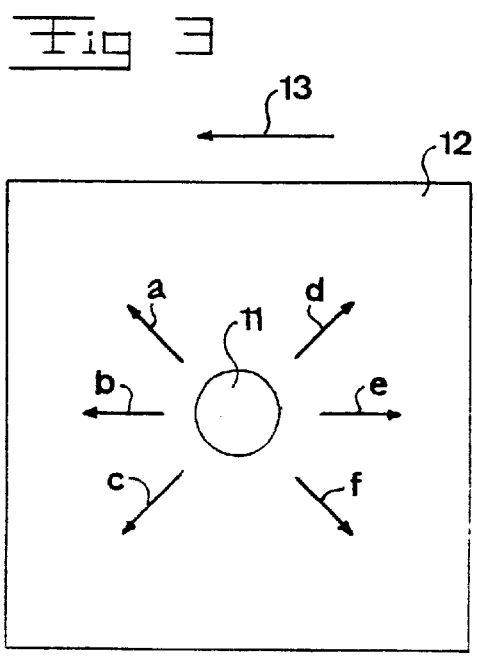
FIG. 3 shows schematically a plan view of the setting arrangement in FIGS. 1 and 2.
Figure 4:
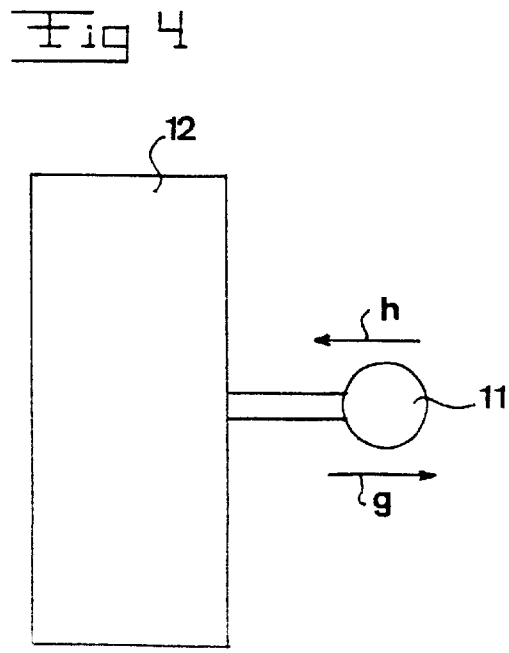
FIG. 4 shows schematically a side view of the setting arrangement in FIGS. 1 and 2.

The setting arrangement (see in particular FIGS. 3 and 4) incorporates only one control lever 11 which is designed to make it possible to adjust the shape of each of the lateral support elements 4 and back support elements 5 by the control lever 11 being movable in various directions. The setting arrangement also incorporates a basic unit 12 on which the control lever 11 is arranged in such a way as to protrude from the basic unit 12. The control lever 11 is designed to assume a neutral position in which, in the embodiment depicted, it extends substantially perpendicular and substantially horizontally outwards from the basic unit 12. When the control lever 11 is in its neutral position, all of the valves 10 will be in a position of rest, i.e. closed.

According to the embodiment depicted, the control lever 11 is so designed that a movement forwards, cf. arrows a,b,c, with respect to the vehicle's normal direction of forward movement 13 causes the back support elements 5 to expand and shift outwards away from the backrest 3 of the seat 1, whereas a movement rearwards, cf. arrows d,e,f, with respect to the vehicle's direction of forward movement 13 causes the back support elements 5 to contract and shift inwards towards the backrest 3 of the seat 1. A pulling movement of the control lever 11 outwards from the basic unit 12 in the direction g causes the lateral support elements 4 to expand and shift outwards away from the backrest 3 of the seat 1, whereas a corresponding pushing movement in the direction h inwards towards the basic unit 12 causes the lateral support elements 4 to contract and shift inwards towards the backrest 3 of the seat 1.

The control lever 11 is also so designed that a movement with a component directed upwards from a neutral position, cf. arrows a and d, activates the uppermost back support element 5 of the backrest 3, whereas a corresponding movement with a component directed downwards, cf. arrows c and f, activates the lowest back support element 5 of the backrest 3. A movement in or opposite to the vehicle's direction of forward movement 13 without any component in the vertical direction, cf. arrows b and e, activates the most central back support element 5.

The invention is not limited to the embodiment depicted but may be varied and modified within the scope of the ensuing patent claims. For example, the invention is not limited to the depicted support elements 4 and 5 but is also applicable to support elements placed differently. The invention is also applicable for adjustment of support elements in the sitting surface 2 of the seat 1. It is certainly also possible within the scope of the invention to vary the number of back support elements 5, e.g. from one to six or more.

The various support elements 4 and 5 may also within the scope of the invention take a form other than inflatable reservoirs and may, for example, incorporate electric drive motors which act upon a movable plate, disc, cushion or the like.

What is claimed is:

1. A setting arrangement for a vehicle seat, comprising the vehicle seat, at least a first and a second separate support element on the seat, each of the support elements being designed and so positioned at the seat for supporting a respective part of a body of an individual on the seat; each support element having a shape which is adjustable for adapting the shapes of the support elements and thereby the shape of the seat to an individual on the seat; the support elements are placed on the seat to form a selected configuration on the seat;

a respective adjustment device connected to each of the support elements and each adjustment device is operable for adjusting the respective shape of the respective support element;

a movable control lever connected with all of the adjustment devices for the at least two support elements, and the control lever is so connected with the respective adjustment devices for adjusting the shapes of the respective support elements by movement of the control lever in a manner which corresponds to the selected configuration and arrangement of the support elements on the seat; the control lever is so operable and so connected with the adjustment devices that movement of the control lever forward with respect to a normal direction of forward motion of the vehicle causes at least a first one of the adjustment devices to shift the respective support element connected to the first adjustment device outwardly away from the seat and so that opposite rearward movement of the control lever causes the first adjustment device to shift the respective support element to shift inwardly toward the seat.

2. The setting arrangement of claim 1, wherein there are at least three of the support elements, a respective one of the adjustment devices connected to each of the support elements and the control lever being connected with the at least three adjustment devices.

3. The setting arrangement of claim 1, wherein the control lever is operable such that a pulling movement on the control lever outward laterally with respect to the direction of forward movement of the vehicle causes a second one of the support elements to shift outwardly away from the seat and opposite pushing movement on the control lever inward laterally with respect to the direction of forward movement of the vehicle causes the second support element to shift inwardly toward the seat.

4. The setting arrangement of claim 1, wherein the seat includes a backrest and the support elements are arranged in the backrest of the seat.

5. The setting arrangement of claim 1, wherein each of the support elements comprises a reservoir and each reservoir is defined by an at least partly flexible material permitting the reservoir to be expanded in at least one direction by input of medium into the reservoir and to be contracted in the opposite direction by discharge of medium from the reservoir, the adjustment devices comprising valving arrangements for enabling medium to be inputted into or discharged from each reservoir, and the control lever being connected with the valving for the respective adjustment devices.

6. The setting arrangement of claim 1, further comprising a base unit at the seat and the control lever protrudes from the base unit;

the control lever having a neutral position which extends substantially perpendicular from the base unit and at the neutral position, the control lever does not cause the adjustment devices to act on the respective support elements.

7. The setting arrangement of claim 6, wherein the control lever in the neutral position extends substantially horizontally.

8. The setting arrangement of claim 7, wherein the control lever and the adjustment devices are designed so that movement of the control lever with a component directed upward from the neutral position thereof activates the respective adjustment device for an upper support element of a backrest to the seat and movement of the control lever with a component directed downwardly activates the respective adjustment device for a lower support element of the backrest.

9. The setting arrangement of claim 6, wherein the seat includes a backrest and the support elements are arranged in the backrest of the seat.

10. The setting arrangement of claim 9, wherein the support elements including an upper support element at the backrest and a lower support element at the backrest below the upper support element; movement of the control lever in one direction operates the adjustment device for the upper support element for the upper support element to move outward from the backrest and movement of the control lever in a second direction operates the adjustment device for the lower support element to cause the lower support element to move outward from the backrest.

11. The setting arrangement of claim 9, wherein the first and second support elements are lateral support elements spaced apart laterally on the backrest of the seat and at least a third one of the support elements is arranged between the lateral support elements; all of the support elements having respective adjustment devices connected with the control lever.

12. The setting arrangement of claim 11, further comprising the at least a third support element comprising at least one upper support element between the lateral support elements and at least one lower support element below the upper support element and also between the lateral support elements, and all of the support elements having respective adjustment devices connected with the control lever.

* * * * *